United States Patent [19]

Baehr

[11] Patent Number: 4,884,743

[45] Date of Patent: Dec. 5, 1989

[54] METHOD OF AND PLANT FOR REGULATING THE TEMPERATURE OF A HEAT CARRIER FLUID

[76] Inventor: Thomas Baehr, Hirtenweg 11a, D-3000 Hannover 1, Fed. Rep. of Germany

[21] Appl. No.: 171,479

[22] Filed: Mar. 21, 1988

[30] Foreign Application Priority Data

Mar. 19, 1987 [DE] Fed. Rep. of Germany ....... 3709085

[51] Int. Cl.$^4$ ........................ F24D 3/02; G05D 23/00
[52] U.S. Cl. .................................... 237/8 R; 237/81; 236/91 F; 165/1; 165/12; 165/22; 364/557
[58] Field of Search ...................... 165/11.1, 12, 22, 1; 236/91 F; 237/8 R, 81; 364/557; 374/40

[56] References Cited

U.S. PATENT DOCUMENTS

| | | | |
|---|---|---|---|
| 2,893,634 | 7/1959 | Hoffman et al. | 364/557 |
| 3,979,710 | 9/1976 | Jespersen | 236/91 F |
| 4,294,402 | 10/1981 | Vollmer | 236/12.1 |
| 4,437,164 | 3/1984 | Branch, III | 364/557 |
| 4,497,438 | 2/1985 | Bonne | 237/8 R |
| 4,629,115 | 12/1986 | Lampert | 165/11.1 |
| 4,708,287 | 11/1987 | De Wit | 237/8 R |
| 4,718,478 | 1/1988 | Huber | 165/11.1 |

FOREIGN PATENT DOCUMENTS

| | | | |
|---|---|---|---|
| 3544905 | 6/1967 | Fed. Rep. of Germany | 237/8 R |
| 2731922 | 11/1978 | Fed. Rep. of Germany | 237/8 R |
| 3036121 | 5/1982 | Fed. Rep. of Germany | 237/8 R |
| 3203832 | 8/1983 | Fed. Rep. of Germany | 237/8 R |
| 3404091 | 8/1985 | Fed. Rep. of Germany | 237/8 R |

Primary Examiner—John Ford
Attorney, Agent, or Firm—Peter K. Kontler

[57] ABSTRACT

A room which is substantially sealed or sealable from the surrounding atmosphere is conditioned by a plant which has a fluid heating or cooling unit, one or more heat exchangers, conduits which connect the unit with the heat exchanger(s), and a computer which is connected with sensors serving to transmit signals denoting the temperature $t_V$ of fluid in the conduit or conduits leading from the unit to the heat exchanger(s), the temperature $t_R$ of fluid in the conduit or conduits leading from the heat exchanger(s) to the unit, and the rate m of fluid flow in the conduit or conduits. These signals are used to calculate a so-called load range prevailing in the room in accordance with the equation $(t_V - t_R) \times m$. The calculated load range is compared with the load ranges of a pattern of load ranges which are characteristic of the plant, and the computer adjusts the unit or a mixing valve in the conduit or conduits leading to the heat exchangers(s) in order to change the value of $t_V$ so that the selected value of $t_V$ conforms to that which was used to calculate the equivalent load range of the pattern.

13 Claims, 7 Drawing Sheets

METHOD OF AND PLANT FOR REGULATING THE TEMPERATURE OF A HEAT CARRIER FLUID

BACKGROUND OF THE INVENTION

The invention relates to a method of and to a plant for regulating the temperature of water, oil or another suitable heat carrier fluid. More particularly, the invention relates to improvements in a method of and in a plant for regulating the temperature of a heated or cooled fluid which flows from a heat influencing unit (e.g., a furnace) to one or more heat exchangers, preferably in one or more spaces which are, or which can be, at least substantially sealed from the surrounding atmosphere.

It is customary to regulate the temperature of a fluid (e.g., water) which flows from a heating unit (such as an air cooler or a furnace) to one or more heat exchangers (such as radiators which are set up in the rooms of a dwelling or a commercial establishment to cool or heat the air in the room or rooms) in dependency on changes of the outside temperature. As a rule, the regulating operation is carried out in such a way that the cooling action or the heat output of the plant conforms to the continuously or intermittently varying gradient between room temperature and outside temperature. A drawback of such plants is that they do not take into consideration the heat storing or accumulating capacity of walls which surround the heated room or rooms. Consequently, an abrupt drop of outside temperature after a longer period of warm weather entails an abrupt increase of the heat output of the furnace in such a plant even though the amount of heat which is stored in the walls would have permitted a relatively short or even an extended delay of an increase of the heat output. Inversely, when the outside temperature rises abruptly after a prolonged cold spell and the temperature rise is substantial, the heat output of the furnace is likely to be reduced prematurely even though the walls are still cold or cool because they are being heated at a rate which is much slower than that of heating of the outside air.

Attempts to overcome the aforediscussed drawbacks of conventional plants include the installation of temperature sensors which are embedded in or otherwise implanted in the walls. This does not solve the problem because such sensors are incapable of adequately monitoring the temperature of an entire wall, i.e., their signals are merely indicative of the wall temperature in their immediate or close proximity. Therefore, the results of measurements which are carried out by such sensors are often misleading and cannot contribute to a pronounced improvement in the heating action of conventional plants.

A further serious drawback of conventional plants is that they are invariably overtaxed if they are to be operated by taking into consideration other variables, such as internal loads in a building complex and the like. The internal loads can include intentional ventilation of rooms by opening the windows or by starting electric fans or other air circulating means as well as the delivery of heat energy, for example, by a large number of persons or in other ways of raising the temperature of confined air. In such instances, a conventional plant must be equipped with additional bulky, complex and expensive controlling and regulating apparatus in order to reduce the likelihood of excessive heat losses or the admission of excessive quantities of heat.

OBJECTS AND SUMMARY OF THE INVENTION

An object of the invention is to provide a novel and improved method which is more economical than heretofore known methods of regulating the temperature of a heat carrier fluid flowing to one or more heat exchangers.

Another object of the invention is to provide a method which renders it possible to take into consideration a large number of parameters including the heat storing capacity of walls surrounding a space wherein the temperature of air is to be regulated as well as the heat consumption and/or delivery of heat by equipment other than the component parts of the plant for regulating the temperature of the heat carrier fluid.

A further object of the invention is to provide a method which can be practiced in connection with the heating or cooling of private dwellings as well as of larger establishments including hotels, restaurants, office buildings, churches and many others.

An additional object of the invention is to provide a novel and improved plant which can be utilized for the practice of the above outlined method.

Still another object of the invention is to provide the plant with novel and improved means for influencing the temperature of the heat carrier fluid flowing from a fluid heating or cooling unit by full consideration of parameters which are disregarded or cannot be taken into consideration in conventional plants.

A further object of the invention is to provide the plant with novel and improved means for ascertaining the so-called surface or area of load range of the circulating heat carrier fluid.

An additional object of the invention is to provide a simple, compact and relatively inexpensive plant which can be installed in existing buildings as a superior substitute for heretofore known air heating and/or cooling systems.

Another object of the invention is to provide the plant with novel and improved means for at least indirectly compensating for the influence of heat storing and dissipating capacity of walls which surround the heated or cooled space on the temperature of confined air.

One feature of the present invention resides in the provision of a method of regulating the characteristics of a heat carrier fluid (such as oil or water) which flows from a heat quantity influencing unit (e.g., a water heating or a water cooling unit) to at least one heat exchanger (e.g., a radiator) and back to the heat quantity influencing unit in a plant for heating or cooling air in a space which is or which can be at least substantially sealed from the surrounding atmosphere. The method comprises the steps of establishing and storing or memorizing a three-dimensional pattern of a plurality of different areas or surfaces of load ranges (hereinafter called load ranges for short) which are characteristic of the air conditioning plant and each of which is a product of $(t_V - t_R) \times m$ wherein $t_V$ and $t_R$ respectively denote the temperature of fluid flowing to and from the at least one heat exchanger and m denotes the rate of fluid flow (namely the volume per unit of time) through the at least one heat exchanger, ascertaining the existing load range (i.e., the actual temperature of fluid flowing to and from the at least one heat exchanger and the actual rate of fluid flow through the at least one heat exchanger), comparing the ascertained load range with the load ranges of the memorized pattern, and altering the value of $t_V$ of the fluid flowing toward the at least one heat exchanger when the value of $t_V$ in the ascertained load range deviates from that in the equivalent load range of the pattern.

The method can further comprise the step of maintaining the value of m at a substantially constant value. Thus, the ascertaining step then merely includes determining the values of $t_V$ and $t_R$ of the fluid flowing to and from the at least one heat exchanger.

The method can also comprise the steps of changing the rate of fluid flow prior to the ascertaining step (e.g., by increasing or reducing the number of heat exchangers which are connected with the unit and/or by increasing or reducing the rate of fluid flow through a particular heat exchanger) and modifying the pattern by a corresponding change of the value of m in the load ranges which constitute the pattern.

The altering step can include selecting the value of $t_V$ of the fluid flowing toward the at least one heat exchanger to match the value of $t_V$ in that load range of the pattern which is identical with the ascertained load range.

The pattern can include a plurality of subpatterns or arrays of load ranges with different values of m. For example, the pattern can be set up with a first array of load ranges when the unit delivers fluid to a constant number of heat exchangers. Then it changes to a second array of load ranges when the unit delivers a larger rate of fluid flow by a larger pump output, and so forth. Such method can further comprise the step of altering the value of m from one of the different values to another of the different values, and the ascertaining step then comprises monitoring the actual value of m and determining the existing load range on the basis of the monitored rate of fluid flow. The altering step of such method comprises changing the value of $t_V$ when the value of $t_V$ in the ascertained load range deviates from that in the equivalent load range of the respective array of load ranges.

The method can also comprise the steps of monitoring the infinitely variable value of m and varying the value of m when the monitored value of m deviates from that in the equivalent load range of the pattern.

Another feature of the invention resides in the provision of a plant for conditioning with a circulating heat carrier fluid (e.g., with water or oil) air which is confined in a space that is or can be at least substantially sealed from the surrounding atmosphere. The plant comprises at least one heat exchanger, a unit (such as a furnace or a cooling system) which influences the quantity of heat in the fluid, conduit means serving to provide a path for the flow of fluid from the unit, to the at least one heat exchanger and back to the unit, adjustable means (e.g., a motor-operated mixing valve) for altering the temperature of fluid flowing to the at least one heat exchanger, a memory which serves to store a three-dimensional pattern of different load ranges which are characteristic of the plant and each of which is a product of $(t_V - t_R) \times m$ wherein $t_V$ and $t_R$ respectively denote the temperature of fluid flowing to and from the at least one heat exchanger and m is the rate of fluid flow in the conduit means, means for ascertaining the existing load range (i.e., for ascertaining the value of the product of $(t_V - t_R) \times m$ wherein $t_V$ is the actual temperature of fluid flowing to the at least one heat exchanger, $t_R$ is the actual temperature of fluid flowing back to the unit and m is the actual rate of fluid flow in the conduit means), means for comparing the ascertained load range with the load ranges of the memorized pattern, and means for adjusting the altering means when the value of $t_V$ in the ascertained load range deviates from that in the equivalent load range of the memorized pattern.

The plant preferably employs computer means which includes the memory, the ascertaining means and the comparing means, and such plant can further comprise means for directly or indirectly monitoring the value of m in the conduit means and for transmitting to the computer means signals which denote the monitored value of m The plant can also comprise means for varying the rate of fluid flow (i.e., the value of m) in the conduit means in stepwise fashion (e.g., by turning off or on one or more discrete heat exchangers or by altering the rate of fluid flow through one or more heat exchangers).

It is further possible to provide the plant with means for substantially infinitely varying the rate of fluid flow in the conduit means, and such varying means preferably includes means for transmitting to the computer means signals which denote the momentary rate of fluid flow.

In accordance with a presently preferred embodiment of the plant, the aforementioned unit includes or constitutes a furnace or other suitable means for heating the fluid.

The novel features which are considered as characteristic of the invention are set forth in particular in the appended claims. The improved plant itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 6:
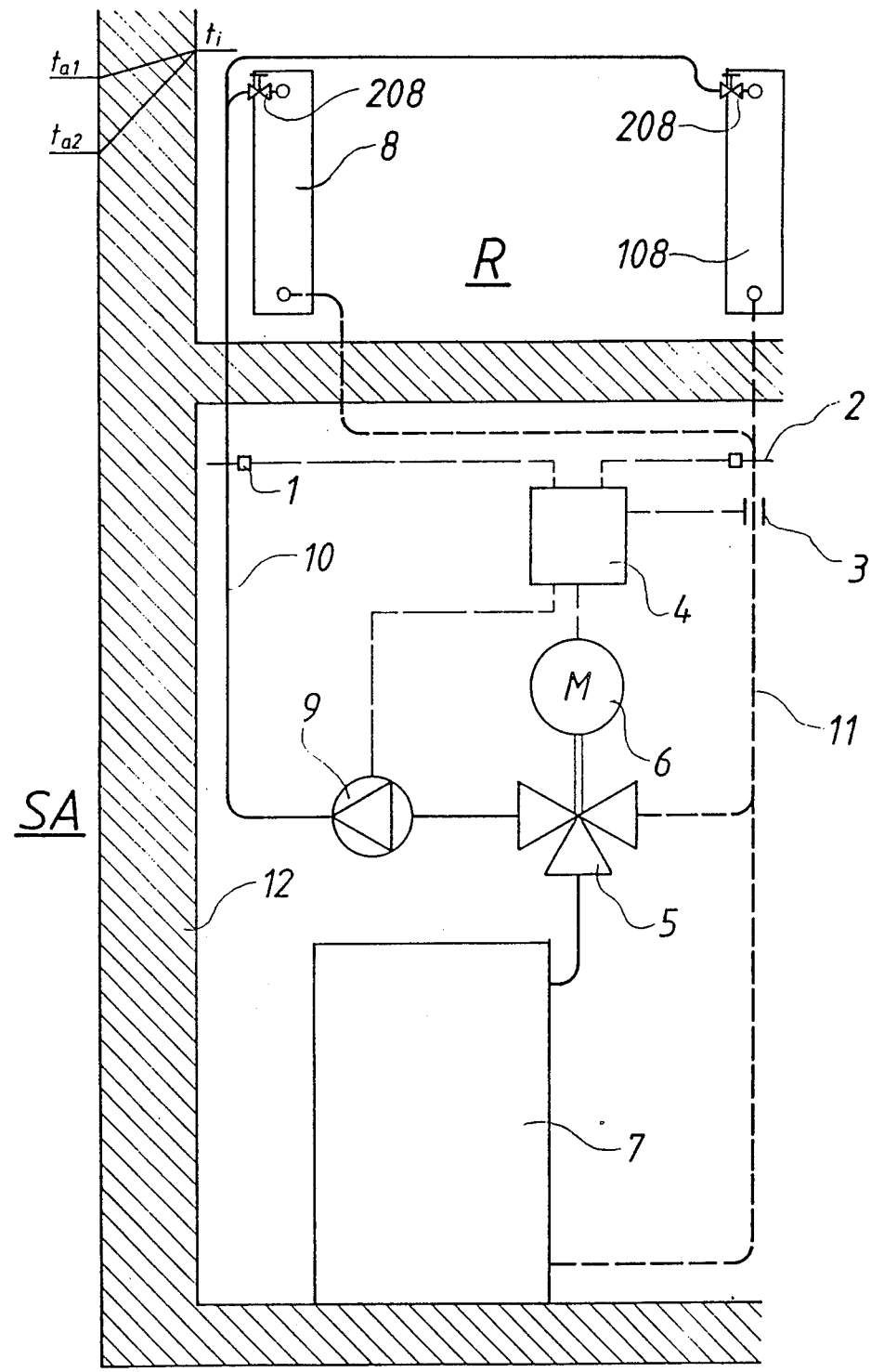
FIG. 6 is a schematic view of a plant which embodies one form of the invention.

Referring first to FIG. 6, there is shown a plant which is designed to condition the temperature of air in a room or space R surrounded by a wall 12 and being normally at least substantially sealed from the surrounding atmosphere SA. The plant comprises a unit 7 (e.g., a furnace) which serves to influence the quantity of heat in a heat carrier fluid (e.g., oil or water) which is caused to flow from the unit 7 to a heat exchanger 8 and back to the unit 7. The conduit means for the circulating fluid comprises a first conduit 10 which conveys heated fluid from the unit 7 to the heat exchanger 8, and a second conduit 11 which conveys spent fluid from the heat exchanger 8 back to the unit 7. The means for altering the temperature $t_V$ of fluid in the first conduit 10 comprises a mixing valve 5 which is adjustable by a reversible electric motor 6 and can alter the temperature of fluid in the conduit 10 by admitting thereto a selected percentage of spent fluid branching off the conduit 11. The plant further comprises a computer 4 which contains a memory for storage of a three-dimensional pattern K (see, for example, FIG. 1) of different load ranges L which are characteristic of the illustrated plant and each of which is a product of $(t_V - t_R) \times m$ wherein $t_V$ is the temperature of fluid in the conduit 10, $t_R$ is the temperature of fluid in the conduit 11 and m is the rate of fluid flow in the conduits 10, 11, i.e., from the unit 7 to the heat exchanger 8 and from the heat exchanger 8 back to the unit 7. The computer 4 further comprises means for ascertaining the existing load range, i.e., the actual temperature $t_V$ in the conduit 10 the actual temperature $t_R$ of fluid in the conduit 11, the actual rate m of fluid flow through the heat exchanger 8, as well as the aforementioned relationship $(t_V - t_R) \times m$, and means for comparing the existing or ascertained load range with the load ranges L of the pattern K in the memory of the computer 4. If the value of $t_V$ in the ascertained load range deviates from the value of $t_V$ in the equivalent load range L of the pattern K in the memory of the computer 4, the latter transmits a signal to the motor 6 which adjusts the mixing valve 5 so as to alter the value of $t_V$ in the fluid flowing in the conduit 10 on toward the heat exchanger 8.

In order to be capable of ascertaining the actual or existing load range, the computer 4 receives signals from a sensor 1 which monitors the temperature of fluid in the conduit 10, from a sensor 2 which monitors the temperature of fluid in the conduit 11, and from a flow rate measuring or monitoring device 3 which can include a capacitor or a system of capacitors and, in the embodiment of FIG. 6, monitors the value of m in the conduit 11. The reference character 9 denotes a variable-delivery pump which is installed in the conduit 10 and can be adjusted in response to signals from the corresponding output of the computer 4 to alter the rate of fluid flow in the conduit 10 (and hence the rate of flow of fluid in the conduit 11).

Figure 1:
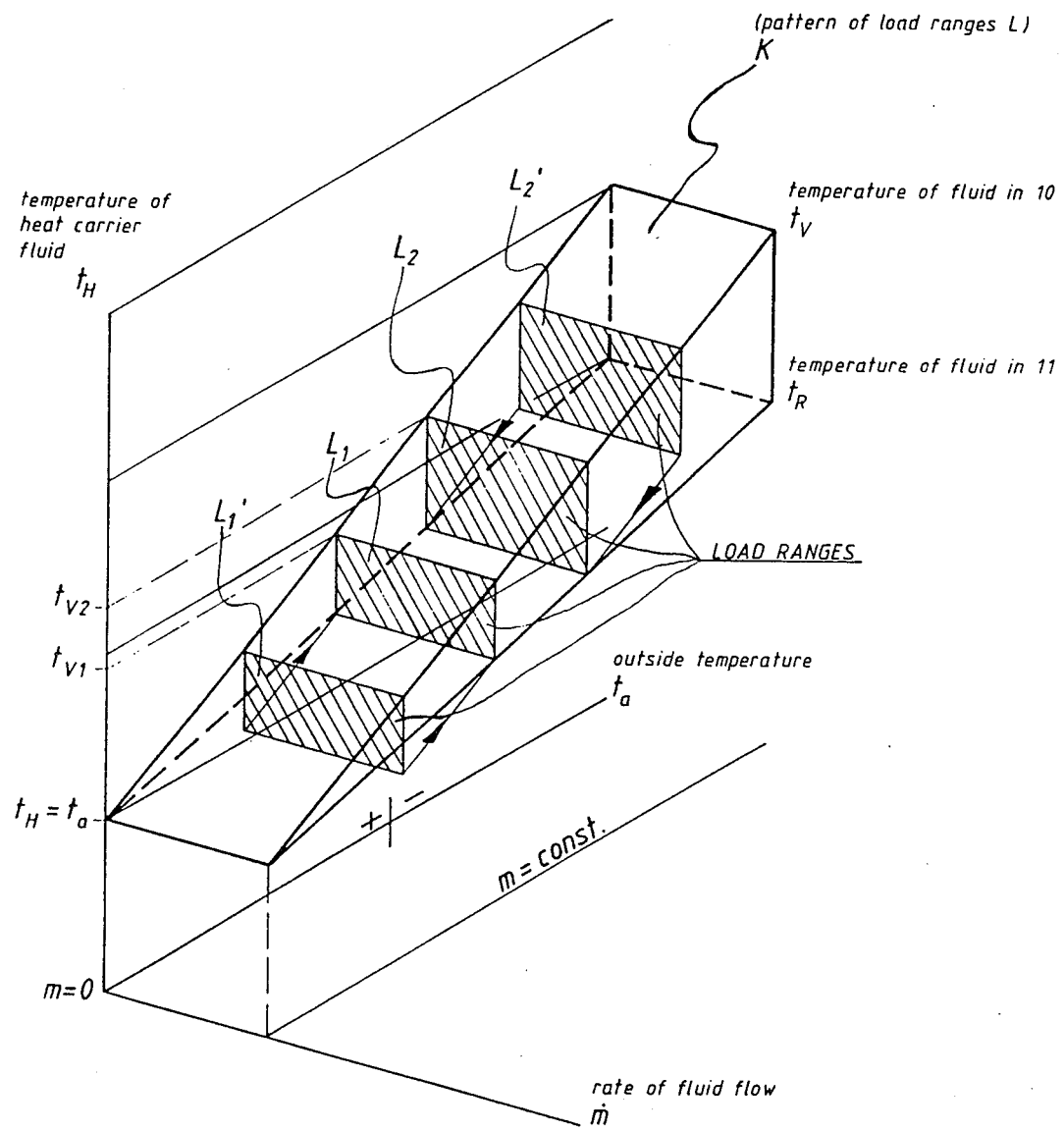
FIG. 1 is a diagram showing a three-dimensional pattern of load ranges and two actual load ranges which are ascertained by the computer of a plant embodying the present invention.

FIG. 1 shows a three-dimensional pattern K of different load ranges L which are characteristic of the plant of FIG. 6 and each of which can be said to be represented by a cross-sectional area in one of a practically infinite number of planes parallel to the plane including the axes m and $t_H$ of the nomogram in the coordinate system of FIG. 1. As explained above, m denotes the rate of flow of fluid (such as water or oil) in the conduits 10 and 11 of the plant. The temperature $t_H$ of the heat carrier fluid is measured along the vertical axis, and the outdoor or outside temperature $t_a$ is measured along the third axis of the coordinate system. It is assumed that the value of m is constant. Each of the infinite number of load ranges L which jointly form the three-dimensional pattern K is a product of $(t_V - t_R) \times m$. The load ranges $L_1'$ and $L_2'$ denote the freshly ascertained heat losses and are displaced with respect to the pattern K.

These load ranges are "shifted" in the direction of the axis $t_a$ until they respectively register with the equivalent load ranges $L_1$ and $L_2$ forming part of the pattern K. This is carried out by the computer 4, and the latter then transmits to the motor 6 a signal to adjust the mixing valve 5 so as to alter the value of $t_V$, namely to alter the value of $t_V$ to match that which was used to calculate the load range $L_1$ (if the actual load range is $L_1$) or to calculate the load range $L_2$ (if the actual load range is $L_2'$)

Figure 2:
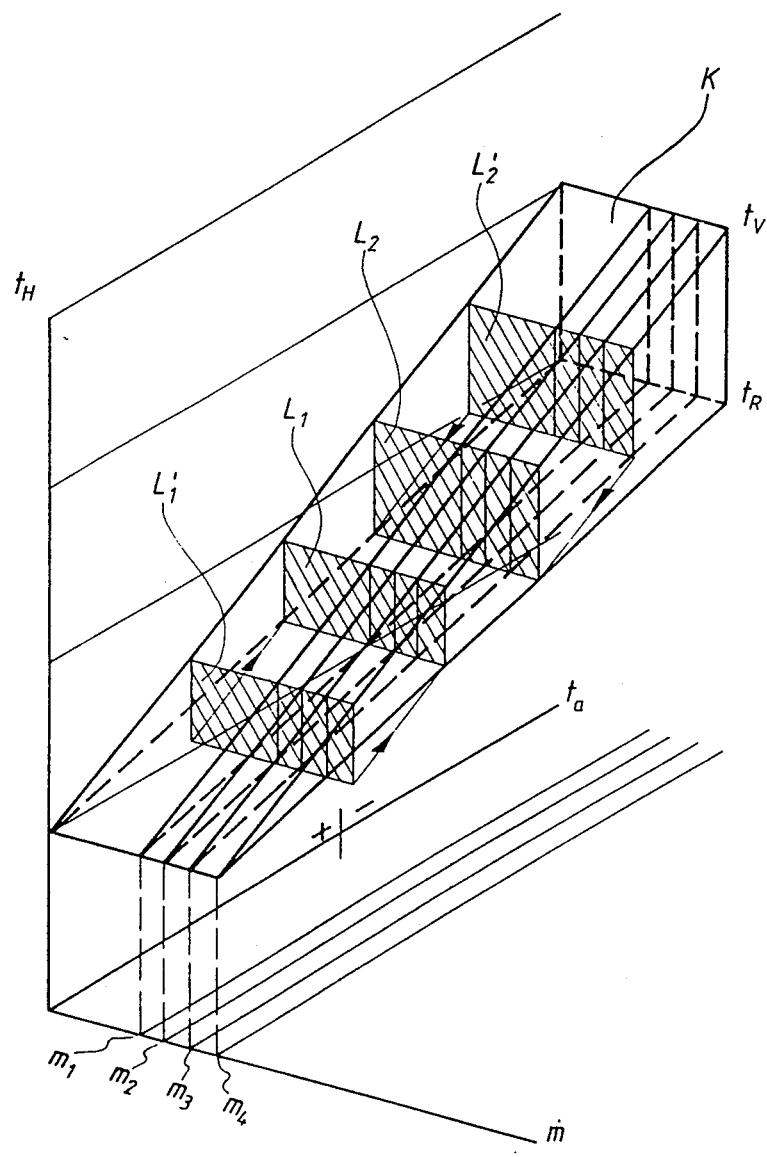
FIG. 2 is a similar diagram showing a second pattern of load ranges and the manner in which the pattern is influenced by changing the rate of circulation of the heat carrier fluid.

FIG. 2 shows a modified pattern of load ranges L denoting the characteristic load ranges of a plant wherein the value of m is varied in stepwise fashion, e.g., by connecting the unit 7 of FIG. 6 with one or more additional heat exchangers (one shown at 108) or by disconnecting one or more heat exchangers from the unit 7. For example, the plant can comprise a total of four heat exchangers each of which can be individually connected with or disconnected from the unit 7 by a separate valve 208. Therefore, the value of m can be changed between $m_1$ (a single heat exchanger connected to the unit 7) and $m_2$, $m_3$ and $m_4$ (unit 7 respectively connected with two, three and four heat exchangers). The mode of operation of the plant which relies on the pattern of FIG. 2 is substantially identical with that of the plant relying on the pattern K of FIG. 1 except that the pattern of FIG. 2 can be modified by increasing or reducing the value of m in dependency on the number of heat exchangers which are connected with the unit 7. For example, if three of the four heat exchangers are disconnected from the unit 7, the pattern of FIG. 2 will be calculated on the basis of information including the temperature $t_V$ of fluid flowing to the single remaining effective heat exchanger, the temperature $t_R$ of fluid flowing from the single remaining heat exchanger back to the unit 7, and the rate $m_1$ of fluid flow from the unit 7 to the single remaining heat exchanger and back to the unit 7.

Figure 3:
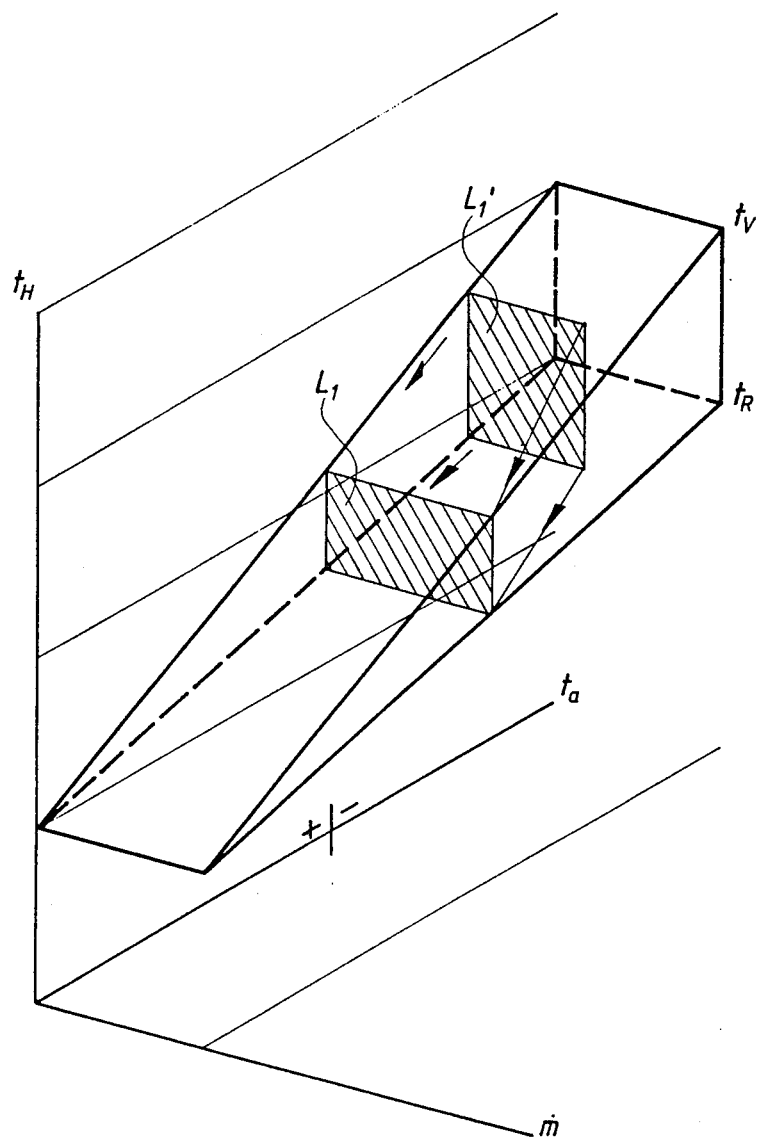
FIG. 3 is a similar diagram showing a third pattern.

FIG. 3 shows a third pattern of load ranges which is obtained when the flow of heat carrier fluid to the heat exchanger is throttled but is not regulated. For example, such pattern is characteristic of load ranges in a plant wherein the flow of fluid is regulated by one or more thermostatic valves which open or close in response to changes of monitored temperature but the fluid circulating pump (9) continues to circulate the fluid at an unchanging rate. An ascertained or existing load range $L_1'$ is shifted in the direction of the axis $t_a$ until it registers with an equivalent load range $L_1$ (wherein the product of $(t_V - t_R) \times m$ matches the product of the parameters $(t_V - t_R) \times m$ for the actual or ascertained load range $L_1'$. In other words, the computer 4 "shifts" the load range $L_1'$ until it locates the load range $L_1$ having the same area in the plane which is parallel to the plane including the $t_H$ and m axes of the coordinate system of FIG. 3.

Figure 4:
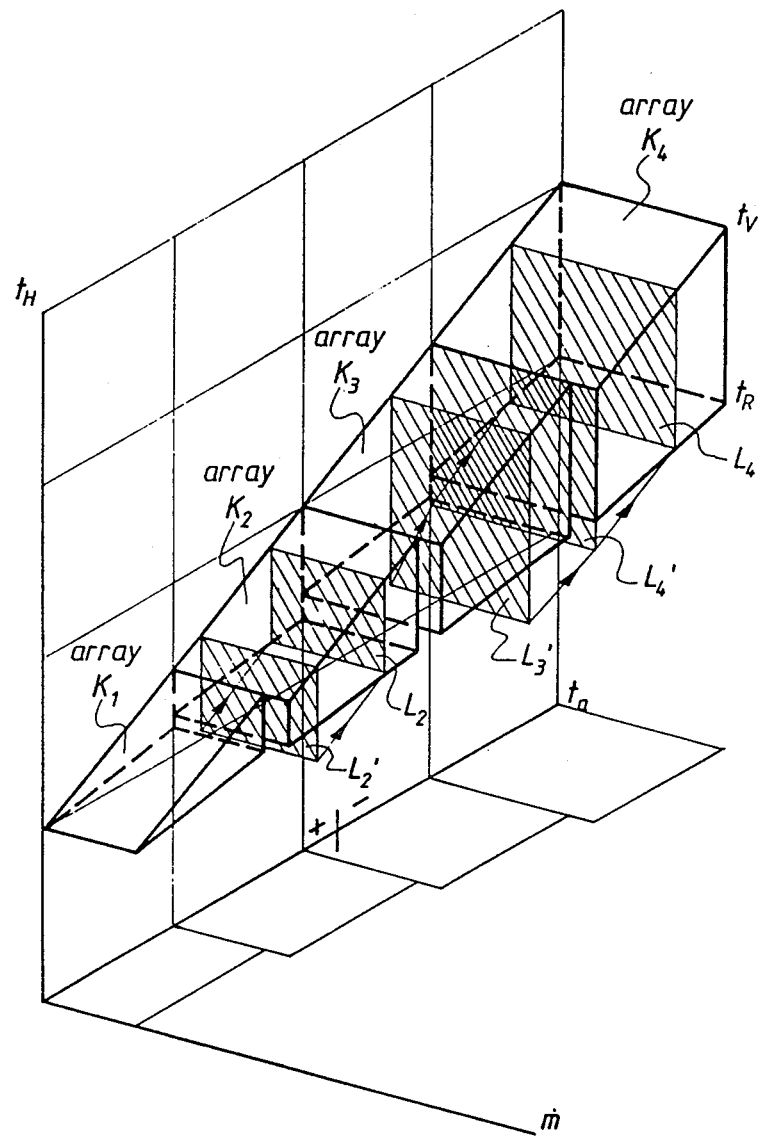
FIG. 4 is a similar diagram showing a fourth pattern which consists of several arrays of load ranges.

Referring to FIG. 4, there is shown a more complex pattern which consists of four discrete arrays $K_1$, $K_2$, $K_3$ and $K_4$ of load ranges. The value of m for calculation of load ranges in the array $K_1$ is less than the value of m for the calculation of load ranges in the array $K_2$, and so forth. Thus, the value of m varies in stepwise fashion.

If the ascertained load range is $L_2'$, such load range is shifted within the respective array $K_2$ in the same way as described for the load range $L_1'$ or $L_2'$ of FIG. 1. However, if it is necessary to cross the boundary between two neighboring arrays, such as the arrays $K_3$ and $K_4$, the product $(t_V - t_R) \times m$ of the load range $L_3$ is first divided with the value of m for the array $K_4$. The thus obtained load range $L_4'$ is thereupon "shifted" within the array $K_4$ until it registers with one ($L_4$) of the load ranges forming the array $K_4$.

Figure 5:
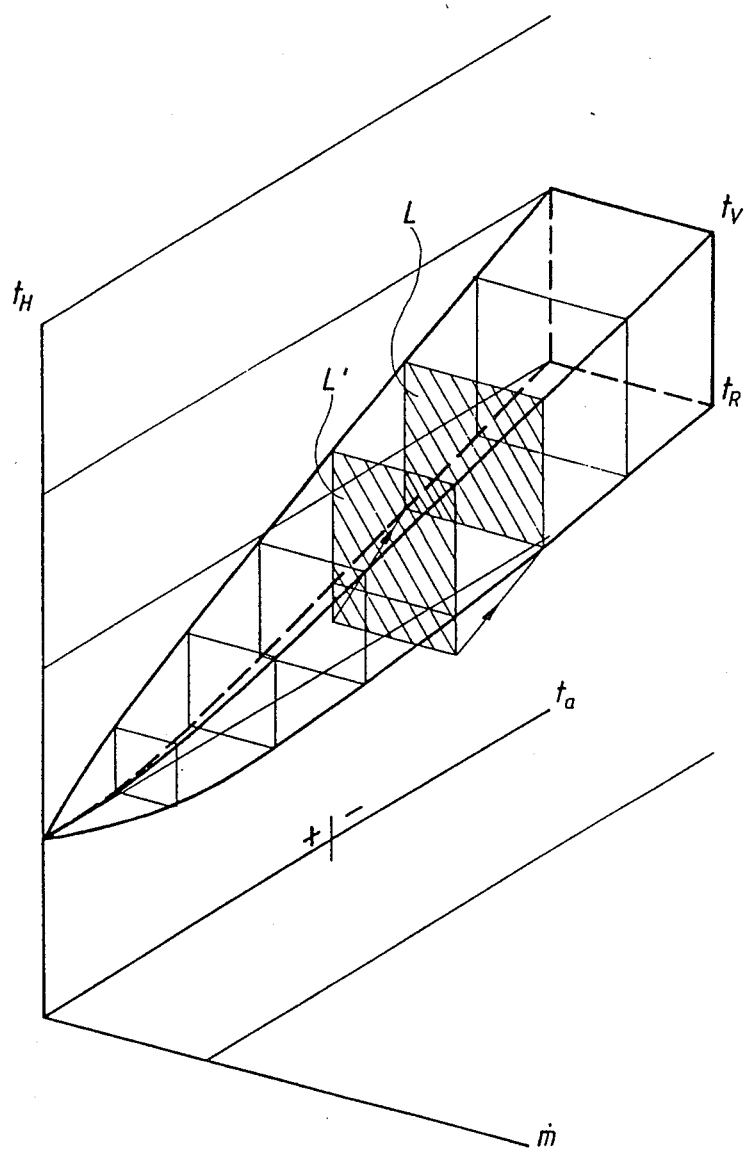
FIG. 5 is a similar diagram showing a fifth pattern which is influenced by infinite variation of the rate of flow of heat carrier fluid.

FIG. 5 shows a fifth pattern which differs from the pattern of FIG. 4 in that the value of m is varied infinitely, e.g., by the pump 9 of FIG. 6. The areas of neighboring load ranges of the pattern can vary linearly or non-linearly all the way between the operation of the respective plant at a maximum load or at zero load. If the computer ascertains that the actual load range is displaced with respect to the pattern, such displaced load range is "shifted" until the computer 4 locates the equivalent load range of the pattern of FIG. 5, and the value of $t_V$ in the conduit 10 is then altered so as to correspond to that of the equivalent load range in the pattern which is characteristic of the respective plant. In other words, the computer 4 locates that load range of the pattern of FIG. 5 wherein the product of $(t_V-t_R)\times m$ is the same as that of the ascertained load range, and the computer then adjusts the motor 6 in order to ensure that the temperature $t_V$ in the conduit 10 will match the value of $t_V$ in the located load range of the pattern.

The operation of the plant which is shown in FIG. 6 (with the pattern K of FIG. 1) is as follows:

Let it be assumed that the plant has adjusted itself to take into consideration an outside temperature $t_{al}$ on a mild winter day so that the temperature $t_{al}$ deviates only slightly from the temperature $t_i$ in the room R which contains the heat exchanger 8. In other words, the temperature gradient between $t_{al}$ and $t_i$ is small or minimal, the same as the rate of heat dissipation by the heat exchanger 8. The product of $(t_V-t_R)\times m$ (i.e., the ascertained load range in the room R) corresponds to a load range of the pattern K consisting of load ranges which are characteristic of the plant of FIG. 6.

Figure 7:
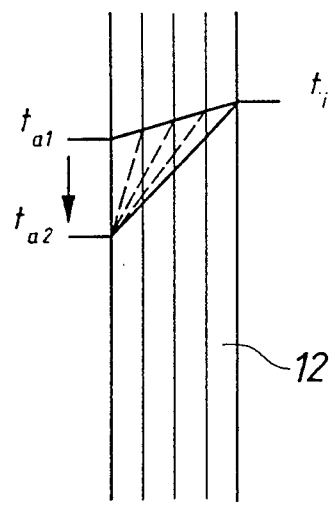
FIG. 7 illustrates the manner in which a wall is cooled in response to a drop of outside temperature.

If the outside temperature drops abruptly from $t_{a1}$ to $t_{a2}$, the plant of FIG. 6 first initiates the consumption of heat which is stored in the wall 12, namely layer-by-layer as indicated in FIG. 7 (starting with the outermost layer and proceeding toward the innermost layer of the wall 12). Such procedure takes place gradually with attendant progressive proportional dissipation of heat by the heat exchanger 8. This is detected by the sensor 2 because the temperature $t_R$ of fluid in the conduit 11 drops. The resulting actual load range is displaced with respect to the pattern K and the temperature $t_V$ which was ascertained preparatory to calculation of such displaced load range does not correspond to the temperature $t_V$ of an equivalent load range L of the pattern K, i.e., of a load range forming the pattern K of load ranges which are characteristic of the plant of FIG. 6. The computer 4 then compares the freshly obtained displaced load range (such load range is calculated on the basis of information furnished by the sensors 1, 2 and the sensor of monitoring device 3) with the load ranges of the pattern K by "shifting" the freshly calculated load range in a direction toward the larger-area load ranges of the pattern K until the computer locates an equivalent load range of the pattern K. The computer 4 then adjusts the motor 6 (and hence the mixing valve 5) to ensure that the temperature $t_V$ in the conduit 10 matches the value $t_V$ of temperature which was relied upon for calculation of the equivalent load range in the pattern K of load ranges. All such calculations and adjustments are carried out automatically. The signals from the computer 4 to the motor 6 may involve repeated adjustments of the mixing valve 5 until the value of $t_V$ actually matches the newly selected value, i.e., until the sensor 1 transmits a signal denoting that the temperature of fluid in the conduit 10 indeed matches that which was used to calculate the freshly located equivalent load range of the pattern. If the value of m deviates from the value of m in the freshly located load range of the pattern K, the computer 4 further transmits a signal to the pump 9 so that the output of the pump is increased or reduced.

Figure 8:
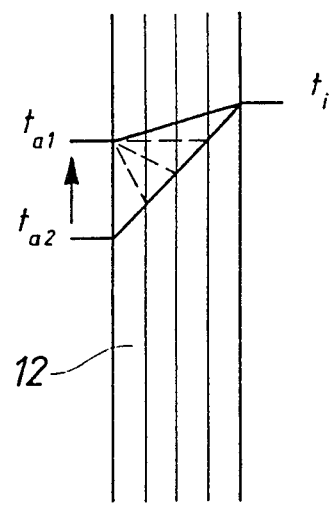
FIG. 8 illustrates the manner in which a wall is heated in response to a rise of outside temperature.

If the outside temperature rises again, for example, from $t_{a2}$ to $t_{a1}$ (FIG. 8), the wall 12 undergoes gradual heating (layer-by-layer) which takes up a certain interval of time. During such interval, the rate of heat dissipation by the heat exchanger 8 decreases accordingly, and this is detected by the sensor 2 which transmits appropriate signals to the computer 4, i.e., the sensor 2 transmits signals which denote that the temperature $t_R$ in the return conduit 11 is on the rise. Thus, the actual load range decreases and the computer 4 addresses the memory to locate the equivalent load range of the pattern K with the attendant generation of a signal to the motor 6 which brings about a corresponding adjustment of the mixing valve 5 and a reduction of the value of $t_V$ in the fluid flowing in conduit 10. If necessary, the computer 4 also adjusts the pump 9.

The mode of operation of the plant of FIG. 6 is basically the same if the temperature in the room R changes for reasons other than mere changes of outside temperature $t_a$. For example, the temperature of air in the room R can change (slightly or drastically) in response to opening of one or more windows and/or doors and/or in response to starting of one or more fans. Thus, on a winter day, the temperature will be reduced by opening one or more windows and/or doors and/or by starting one or more fans which draw outside air into and expel stale air from the room R. Inversely, the temperature in the room R will rise if the room is occupied by a large number of persons and/or animals and/or if the room contains one or more ovens, portable heaters and/or other means for raising the temperature of air. If the temperature of air in the room R drops for reasons other than changes of outside temperature $t_a$, the new load range L is ascertained by the computer 4 and the computer addresses its memory to locate the equivalent load range of the pattern K of load ranges which are characteristic of the plant of FIG. 6. The value of $t_V$ is increased. If the temperature in the room R rises, the computer 4 compares the ascertained actual load range with the load ranges of the pattern K and selects the equivalent or matching load range of the pattern to thereupon select a different value of $t_V$ in the aforedescribed manner, i.e., the new value of $t_V$ equals that of $t_V$ which was relied upon to calculate the equivalent load range of the pattern K. In other words, the value of $t_V$ is then reduced.

If the plant of FIG. 6 is furnished without a mixing valve 5, signals which are transmitted by the computer 4 are used to directly influence the heating action of the unit 7.

It is clear that signals which are transmitted by the computer 4 (to the motor 6 for the mixing valve 5, to the pump 9 and/or directly to the unit 7) are modified accordingly if the plant serves to circulate a fluid other than water (e.g., oil) by taking into consideration the specific heat of the selected heat carrier fluid.

The improved plant can be used to regulate the temperature of air in private dwellings as well as in industrial plants, office buildings and any other establishments wherein a controlled automatic regulation of air temperature is desirable or necessary. Moreover, the unit 7 can be designed to heat or cool the heat carrier fluid, i.e., the plant can be used as an air heating or as an air cooling plant.

Strictly speaking, the load range is simply the difference between the values of $t_V$ and $t_R$, and the product of $(t_V-t_R) \times m$ actually denotes the heat loss flux in the fluid circuit. A particular value of $t_V$ is assigned to each value of heat loss flux. Thus, the computer 4 actually monitors the heat loss flux and thereupon ascertains the corresponding value of $t_V$ in the pattern of load ranges.

An important advantage of the improved method and plant is that it is possible to accurately consider parameters which cannot be properly considered in heretofore known plants. Such parameters include the heat storing capacity of the walls, the heating and/or cooling of confined air by means other than the unit 7, and certain others. This results in considerable savings in heat energy and in greater comfort to the occupant or occupants because it is possible to maintain the temperature of confined air exactly at a selected value regardless of the (pronounced or less pronounced) changes of the aforediscussed parameters, such as the temperature of the walls. Moreover, one can dispense with the conventional sensors of atmospheric conditions, sensors in the walls and the appurtenant conduits which are necessary parts of conventional means for regulating the temperature of a heat carrier fluid flowing from the heat influencing unit to the heat dissipating or heat withdrawing means, such as one or more heat exchangers.

Standard characteristic curves for temperature regulating systems are well known in the art. They are indicative of a functional relationship between the temperature difference $(t_V-t_R)$ and the outside temperature $t_a$. The regulating systems of conventional plants are operated in accordance with programs which are formed by such characteristic curves. When the temperature in a room wherein the temperature of air is regulated by such conventional plants is too high or too low, the regulating means bring about appropriate adjustments.

It is further customary to calculate the heat energy requirements of each building which is to be equipped with a temperature regulating plant. Thus, one calculates the required heat quantity Q which, if the heat carrier fluid is water, is determined primarily by the product of $m \times dt$ wherein dt is the difference between $t_V$ and $t_R$. In other words, $Q = m \times (t_V-t_R)$. The mass flow, which is variable, can be determined on the basis of such equation. The reason for variableness of the mass flow m is that the number of heat exchangers which are connected with the heat influencing unit can be changed.

Heretofore known programs rely on characteristic curves which are determined by considering the characteristics of the building wherein the plant is to be installed as well as the characteristics of the plant, such as the nature of heat carrier fluid which is circulated between the heat influencing unit and the heat exchanger or heat exchangers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of regulating the characteristics of a heat carrier fluid which flows from a heat quantity influencing unit to at least one heat exchanger and back to the heat quantity influencing unit in a temperature regulating plant, comprising the steps of establishing a three-dimensional pattern which is characteristic of the plant and represents load range as a function of external temperature where load range is a rectangular area bounded by two sides of length $(tV-t_R)$ and two sides of length m, $t_V$ and $t_R$ respectively denoting the temperature of fluid flowing to and from the at least one heat exchanger and m being the rate of fluid flow through the at least one heat exchanger; ascertaining an actual load range for the plant by determining the product $(t_{V-t_R}) \times m$ for the fluid flowing to and from the at least one heat exchanger; comparing the actual load range with the load ranges of the pattern; and altering the value of $t_V$ of the fluid flowing toward the at least one heat exchanger when the actual load range deviates from the pattern.

2. The method of claim 1, further comprising the step of maintaining the rate of fluid flow through the at least one heat exchanger at a substantially constant value, said ascertaining step including determining the difference between $t_V$ and $t_R$ of the fluid flowing to and from the at least one heat exchanger.

3. The method of claim 1, further comprising the steps of changing the rate of fluid flow prior to said ascertaining step and modifying the pattern by a corresponding change of the value of m in the load ranges which constitute the pattern.

4. The method of claim 1, wherein said altering step includes selecting the value of $t_V$ to match the value of $t_V$ in that load range of the pattern having a identical area to the actual load range.

5. The method of claim 1, wherein the pattern includes a plurality of arrays of load ranges with different values of m, said ascertaining step including monitoring the actual value of m and determining the actual load range on the basis of the actual value of m, said altering step including selecting the value of $t_V$ of the fluid flowing to the at least one heat exchanger to match the value of $t_V$ in that load range of the pattern having an area which is identical to that of the actual load range; and further comprising the step of changing the actual value of m from one of said different values to another of said different values when the actual values of $t_V$ and m correspond to one of said arrays and the load range of said pattern having an area which is identical to that of the actual load range corresponds to another of said arrays.

6. The method of claim 1, further comprising the steps of monitoring the value of m and varying the value of m when the monitored value of m deviates from that in a load range of the pattern having an area which is identical to that of the actual load range.

7. The method of claim 5, wherein said changing step comprises dividing the actual value of m by the value of m for said other array.

8. A temperature regulating plant with a circulating heat carrier fluid, comprising at least one heat exchanger; a unit for influencing the quantity of heat in the fluid; conduit means providing a path for the flow of fluid from said unit to said at least one heat exchanger and back to said unit; adjustable means for altering the temperature of fluid flowing to said at least one heat exchanger; a memory containing a three-dimensional pattern which is characteristic of the plant and represents load range as a function of external temperature where load range is a rectangular area bounded by two sides of length $(t_V-t_R)$ and two sides of length m, $t_V$ and $t_R$ respectively denoting the temperature of fluid flowing to and from the at least one heat exchanger and m being the rate of fluid flow in the conduit means; means for ascertaining an actual load range for the plant by determining the product $(t_V-t_R) \times m$ for the fluid flowing to and from the at least one heat exchanger; means for comparing the actual load range with the load ranges of said pattern; and means for adjusting said altering means when the actual load range deviates from the pattern.

9. The plant of claim 8, comprising computer means including said memory, said ascertaining means and said comparing means; and further comprising means for monitoring the value of m in said conduit means and for transmitting to said computer means signals denoting the monitored value of m.

10. The plant of claim 8, further comprising means for varying the rate of fluid flow in said conduit means in stepwise fashion.

11. The plant of claim 10, comprising a plurality of heat exchangers, said means for varying the rate of fluid flow including means for selectively establishing and terminating the flow of fluid between said unit and at least one of said plurality of heat exchangers.

12. The plant of claim 8, comprising computer means including said memory, said ascertaining means and said comparing means; and further comprising means for infinitely varying the rate of fluid flow in said conduit means including means for transmitting to said computer means signals denoting the momentary rate of fluid flow.

13. The plant of claim 8, wherein said unit includes means for heating the fluid.

* * * * *